United States Patent [19]

Ashcroft et al.

[11] Patent Number: 5,046,457
[45] Date of Patent: Sep. 10, 1991

[54] ANIMAL ENCLOSURE APPARATUS, AND METHODS OF CONSTRUCTING AND UTILIZING SAME

[76] Inventors: Richard N. Ashcroft, 13 Walnut; John J. Jennings, 202 North Dr., both of Wyandotte, Mich. 48192

[21] Appl. No.: 494,432
[22] Filed: Mar. 16, 1990
[51] Int. Cl.⁵ .............................................. A01K 1/035
[52] U.S. Cl. ....................................... 119/168; 119/19
[58] Field of Search ................ 119/168, 19, 169, 170; 229/103, 186, 189

[56] References Cited

U.S. PATENT DOCUMENTS

| 1,687,678 | 10/1928 | Mallory | 229/186 X |
| 2,792,165 | 5/1957 | Thompson | 229/186 |
| 2,838,222 | 6/1958 | Papadopoulos | |
| 3,016,042 | 1/1962 | Curn, Jr. | 119/19 |
| 3,105,626 | 10/1963 | Bowdoin | |
| 4,348,982 | 9/1982 | Selby | 119/1 |
| 4,792,082 | 12/1988 | Williamson | 229/103 |
| 4,807,563 | 2/1989 | Berry et al. | 119/1 |
| 4,846,103 | 7/1989 | Brown | 119/1 |
| 4,884,527 | 12/1989 | Skirvin | 119/1 |

Primary Examiner—Robert P. Swiatek
Attorney, Agent, or Firm—Irving M. Weiner; Robert M. Petrik; Joseph P. Carrier

[57] ABSTRACT

An animal enclosure apparatus adapted to be assembled entirely by a user from a single symmetrically-arranged foldable blank of biodegradable, disposable material. The enclosure apparatus is particularly suited for providing a sanitary kitty litter enclosure which shields the surrounding area from debris and odors. A flap is provided for opening a passageway for an animal to enter and exit the enclosure, and to close the passageway so that the apparatus is entirely sealed for disposal of the exhausted litter.

17 Claims, 1 Drawing Sheet

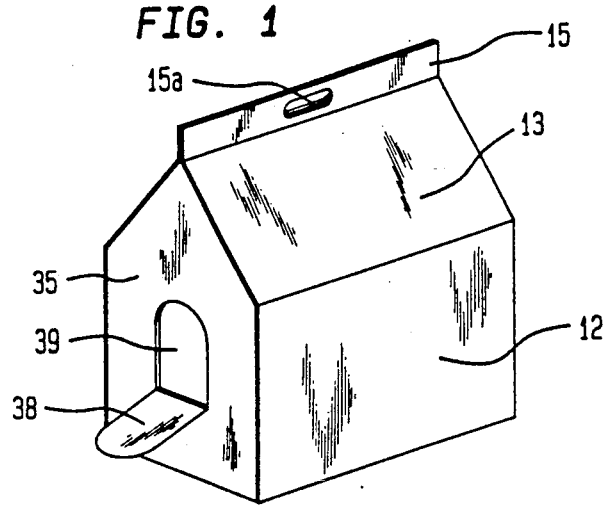
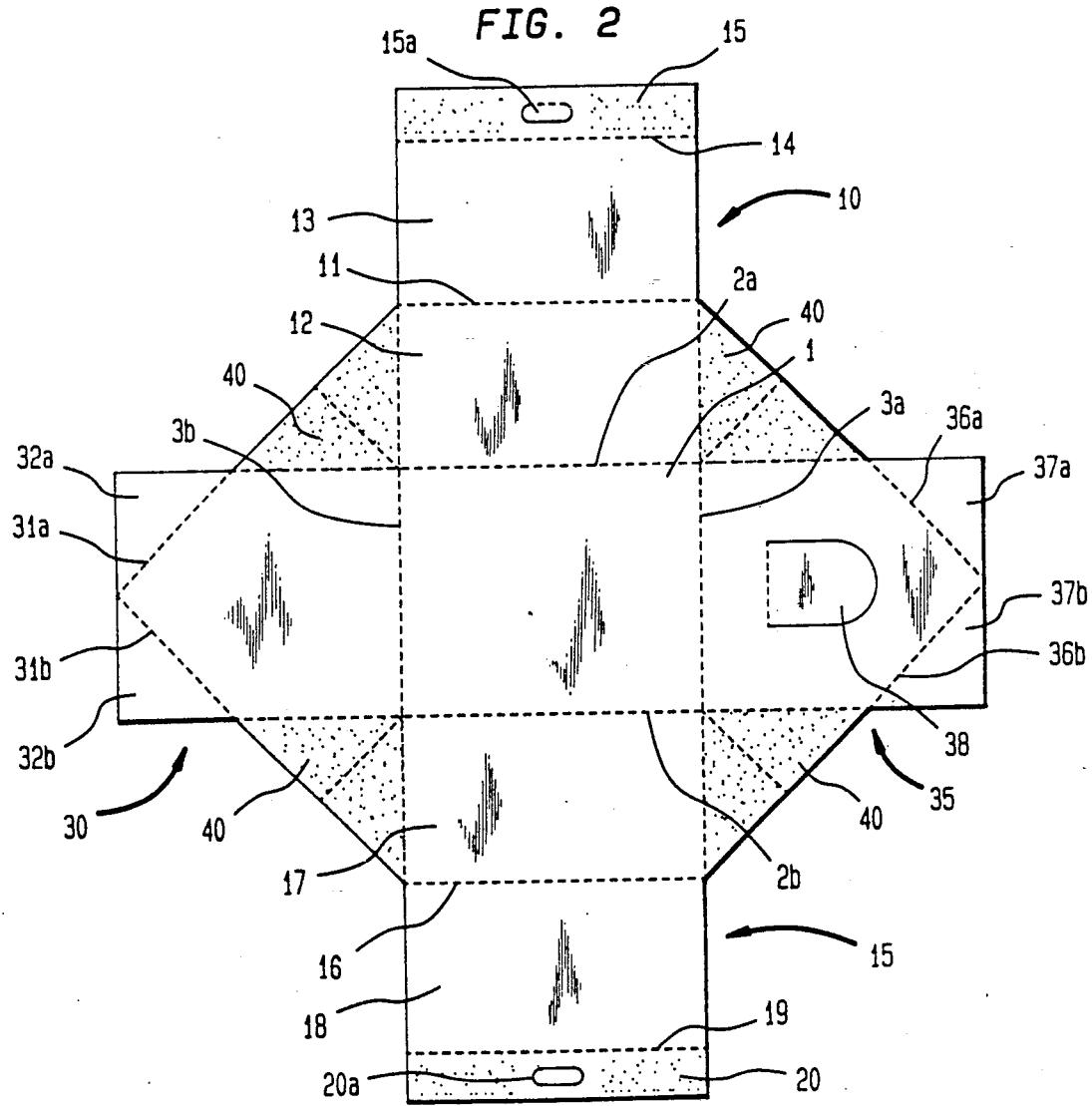

ANIMAL ENCLOSURE APPARATUS, AND METHODS OF CONSTRUCTING AND UTILIZING SAME

BACKGROUND OF THE INVENTION

1. Field of the Invention

The present invention relates generally to an animal enclosure apparatus formed from a single sheet of substantially stiff foldable material so as to be easily assembled by a user. More particularly, the invention relates to an animal enclosure apparatus particularly suited for use as a kitty litter apparatus defining a sanitary enclosure which prevents ordors and debris from escaping to the surrounding environment, and which may be easily and conveniently disposed of by a user.

The terminology "kitty litter" as employed herein connotes a particulate material with moisture absorbing qualities commonly placed in a receptacle to provide a cat with a place to relieve itself. Many varieties of kitty litter are commercially available, some of which contain sand or ground clay, for example.

2. Description of Relevant Art

There is a growing tendency to keep household pets such as cats indoors most of the time in order to protect them from outdoor dangers such as passing cars, other animals, etc. A primary problem associated with keeping such pets indoors is the need to provide a litter area in which the pet can relieve itself without creating unsanitary or undesirable conditions for people whose living space encompasses the litter area. Even when pets are allowed outdoors on a regular basis, this same problem arises since it often necessary or desirable to provide a litter area for the pet for those times when it is indoors.

The most commonly known means for providing a litter area for a household cat to relieve itself indoors is simply to place kitty litter material in a shallow box or other similar receptacle. However, such a typical arrangement presents a number of problems. Even though molisture absorbent litter material may be used, the accumulation of body waste in and on the material leads to unpleasant odors in the household area around the kitty litter box. The tendency of cats to bury their body waste leads to the unsanitary spread of litter meterial outside the box. Problems also arise in disposing of the exhausted kitty litter material. Removal of the dirty litter is unpleasant, and unless the box or other container is cleaned with a stron cleaning agent, unpleasant odors and unsanitary conditions result.

Known attempts to overcome some of the foregoing problems have generally taken the form of providing a disposable receptacle with self-contained closure means which permits disposing of the receptacle and exhausted litter together. Such devices are typically sold as a box-shaped unit with kitty litter already provided therein. Illustrative of such devices are those disclosed in U.S. Pat. No. 4,792,082 issued Dec. 10, 1988 to Williamson; U.S. Pat. No. 4,807,563 issued Feb. 28, 1989 to Berry et al; and U.S. Pat. No. 4,846,103 issued July 11, 1989 to Brown. Some of such known devices are also provided with enclosing means for the animal using the device, e.g., the devices disclosed in the aforesaid U.S. Pat. Nos. 4,792,082 and 4,846,103.

A number of difficulties arise from the foregoing illustrative attempts to overcome the unsanitary and unpleasant conditions associated with kitty litter boxes. The foregoing devices are all designed for sale as a partially assembled unit complete with kitty litter therein. The units thus consume considerable shelf space, are generally heavy for the user to transport after purchasing same, and tend to be relatively expensive. Those units which provide enclosing means for the animal require assembly steps for forming the enclosure during manufacture, tend to be relatively complex in structure, and expensive, and must be at least partially disassembled by the user before disposing of the unit.

There are also known various types of folding or knockdown box devices designed to be assembled and/or disassembled by a user, such as disclosed in U.S. Pat. No. 2,838,222 issued in 1958 to Papadopoulos and U.S. Pat. No. 3,105,627 issued in 1963 to Bowdoin. These devices comprise blanks with fold lines which permit a user to assemble the blank into a carton for storing or transporting items. Such devices are not generally suitable for use as a kitty litter apparatus because they are not designed to permit a pet to enter or exit from same, to comfortably accommodate a pet therein, etc.

The present invention effectively overcomes the problems associated with providing a sanitary litter area for a household pet, while avoiding the difficulties encountered with known devices. The apparatus according to the invention is designed to be assembled by a user, form a fully collapsed state to a state ready for use, in a few simple steps. The assembled apparatus provides a very sanitary enclosure which virtually eliminates odors and debris normally associated with kitty litter boxes. The appratus is inexpensive, easy to transport, and conveniently disposed of without requiring disassembly.

SUMMARY OF THE INVENTION

The present invention provides an animal enclosure apparatus, comprising a blank formed of a sheet of substantially stiff foldable material. The blank includes an oblong bottom wall portion, and opposite combined side and roof wall portions extending symmetrically outwardly from, and coextensively with, first and second relatively longer sides of the oblong bottom wall portion. The blank also includes opposite front and back wall portions extending symmetrically outwardly from, and coextensively with, third and fourth relatively shorter sides of the bottom wall portion. Fold lines are provided along the first, second, third and fourth sides of the bottom wall portion, and between the side and roof wall portions of the combined portions. Portions of the blank being folded upwardly at the fold lines in an assembled state of the apparatus such that the front, back and side wall portions are arranged in substantially vertical planes, the bottom wall portion is arranged in a substantially horizontal plane, and the roof wall portions are arranged in inclined planes extending upwardly and inwardly from the side wall portions, such that the apparatus defines a complete enclosure.

In a preferred embodiment, the appratus of the invention comprises a disposable kittly litter enclosure apparatus for assembly by a user. The front and back wall portions each include bendable triangular flaps adapted to be folded inwardly so as to be disposed adjacent inside roof wall portions. The front wall portion includes a passageway dimensioned to permit a cat to enter and exit the apparatus, the passageway being defined by a flap adapted to be bend outwardly and downwardly to open the passageway, and back upwardly and inwardly to close the passageway when it is desired to dispose of the apparatus and its contents. Gussets extend between the side wall portions and the front and back wall portions, respectively, each gusset being foldable inwardly to define a closed corner portion in the assembled state of the apparatus. A handle portion is provided at the outer end of each combined side and roof wall portions, the handle portions being joined in the assembled state of the apparatus.

The invention also provides a method of assembling an animal enclosure apparatus from a single blank provided with a series of wall portions and fold lines. The method comprises the steps of: upwardly folding, relative to an oblong bottom wall portion of the blank, opposite combined side and roof wall portions which extend symmetrically outwardly from, and coextensively with, first and second relatively longer sides of the oblong bottom wall portion; inwardly folding the roof wall portions relative to the side wall portions such that handle portions provided at the upper ends of the roof wall portions engage each other; connecting the handle portions together with suitable connecting means; and upwardly folding, relative to the bottom wall portion, opposite front and back wall portions which extend symmetrically outwardly from, and eoextensively with, third and fourth relatively shorter sides of the bottom wall portion.

It is an object of the invention to provide a kitty litter enclosure apparatus adapted to be purchased by the user in an entirely collapsed, disassembled state, and assembled by the user in a few simple steps. No disassembly of the apparatus is required before disposal.

A further object of the invention is to provide a sanitary enclosure for an animal which prevents odors and debris from contaminating the home area where the apparatus is located.

Yet another object of the invention is to provide an animal enclosure apparatus with strength and stability features which permit disposal of the apparatus and its contents in its fully assembled state. A pet passageway flap of the apparatus serves the dual purpose of permitting the pet to enter and exit the enclosure and thereafter closing the passageway when it is desired to seal the apparatus for disposal.

The above and further objects, details and advantages of the invention will become apparent from the following detailed description, when read in conjunction with the accompanying drawings.

BRIEF DESCRIPTION OF THE DRAWINGS

FIG. 1 is a perspective view of the animal enclosure apparatus of the invention in its assembled state, with the pet passageway open.

FIG. 2 is a top plan view of the blank used for assembling the animal enclosure apparatus of FIG. 1.

DETAILED DESCRIPTION OF PREFERRED EMBODIMENTS

With reference to FIG. 1, the animal enclosure apparatus according to the invention is shown in its fully-assembled condition, ready for use as a pet sanitary litter enclosure or the like. The enclosure of FIG. 1 is assembled from a single blank integrally fromed form a single sheet of substantially stiff (shape retentive) foldable material, the blank being shown in FIG. 2. The material of the blank is desirably biodegradable and disposable, such as cardboard. In a preferred embodiment, the cardboard material comprises white pharmaceutical cardboard. The blank is adapted to be conveniently and quickly assembled into the animal enclosure of FIG. 1 without requiring auxiliary fasteners or other means.

As shown in FIG. 2, the blank of the invention includes a centrally-disposed oblong bottom wall portion 1 having first and second relatively longer opposite sides 2a, 2b and third and fourth relatively shorter opposite sides 3a, 3b. Projecting integrally and symmetrically outwardly from the longer sides 2a, 2b of bottom wall portion 1 are opposite combined side wall, roof wall and handle portions 10 and 15. Fold lines are provided along each of the sides 2a, 2b of bottom wall 1, between bottom wall 1 and the opposite combined portions 10, 15, respectively. The combined portions 10 and 15 are each provided with fold lines 11, 16, respectively, defining respective side wall portions 12, 17 and respective roof wall portions 13, 18 of the combined portions 10, 15. The combined portions 11, 15 are further respectively provided with fold lines 14, 19 defining handle portions 15, 20, extending from roof wall portions 13, 18, respectively. The handle portion 20 is provided with a cut-out hand grip portion 20a, while the handle portion 15 is provided with a flap 15a adapted to matingly engage hand grip portion 20a as described below. The flap 15a is cut out in the shape of hand grip portion 20a, with an upper fold line at which the flap 15a remains attached to handle portion 15.

Projecting integrally and symmetrically outwardly from the shorter sides 3a, 3b of bottom wall portion 1 are opposite back and front wall portions 30, 35. Fold lines are provided along each of the sides 3a, 3b of bottom wall 1, between bottom wall 1 and the opposite back and front wall portions 30, 35, respectively. The back and front wall portions 30, 35 are provided with angled fold lines 31a, 31b and 36a, 36b, respectively, defining a pair of triangular corner flap portions 32a, 32b and 37a, 37b on the back and front wall portions 30, 35, respectively. The front wall portion 35 is also provided with a flap 38 defined by a U-shaped cut-out with a bottom fold line at which the flap 38 remains attached to front wall 35.

As also shown in FIG. 2, four gusset portions 40 are respectively provided at the inside corner portions defined between the side wall portions 12, 17 and the back and front wall portions 30, 35. Each of the gusset portions 40 is provided with central fold lines as shown, which permit the gussets 40 to be folded inwardly to define closed corner portions for the apparatus as will be described below.

Illustrative suitable dimensions for the various portions of the blank, in one preferred embodiment, are as follows. The longer sides 2a, 2b of bottom wall 1 are each approximately 18", while the shorter sides 3a, 3b of bottom wall 1 are each approximately 15". The side walls 12, 17 are each 9 ½" high (vertical direction), while the roof walls 13, 18 are each 13" high and the handle portions 15, 20 are each 3" high (vertical direction). The front wall 35 and back wall 30 each protrude outwardly from bottom wall 1 a distance of approximately 17". The hypotenuses of the gussets 40 each measure approximately 13½". The overall height of the blank of FIG. 2 measure approximately 60", and the overall width is approximately 52". When assembled, the enclosure of FIG. 1 thus has a height to the peak of the roof of approximately 17", and a height to the top of the handle portions of approximately 20".

Assembly of the blank to define the animal enclosure of FIG. 1 is accomplished primarily by folding portions of the blank upwardly about their respective fold lines. Indeed, folding about the respective fold lines is all in the upward direction with the exception of handle portions 15, 20, which are folded outwardly (or downwardly).

The user folds the rectangular back wall 30, front wall 35, and side walls 12, 17 upwardly relative to bottom wall 1 to substantially vertical orientations, with the gussets 40 each being folded inwardly. Preferably, the insides of gussets 40 (i.e., the back sides in FIG. 2) are provided with self-stick adhesive, i.e., pressure-sensitive adhesive, so that once folded, the gussets will be be adhered in their folded-in positions. At this point, or at some other desired point, the user can place a desired quantity of kitty litter material within the enclosure.

To complete assembly of the enclosure, the roof walls 13, 18 are bent relative to their respective side walls 12, 17 in an inclined direction toward each other, so that handle portions 15, 20 are disposed proximal each other. The handle portions 15, 20 are bent outwardly and their opposing faces, each provided with self-stick adhesive, brought into engagement. The flap 15a can then be folded through the cut-out 20a to further secure the mating handle portions 15, 20 together and define a mating hand grip portion for carrying the assembled enclosure. The corner flaps 32a, 32b, and 36a, 36b are bent upwardly (inwardly) and positioned adjacent respective inside surface portions of roof walls 13, 18.

The flap 38 on front wall 35 is folded outwardly and downwardly as shown in FIG. 1 to define a passageway 39 for an animal to enter and exit the assembled enclosure. When it is desired to close the enclosure for disposal, the flap 38 is bent back upwardly to close passageway 39. Adhesive means such as tape may be provided on or adjacent flap 38 to permit secure closing of the enclosure and to ensure that the soiled litter will remain contained therein for disposal purposes.

The dimensions of the bank described above are well suited for accommodating a cat in the assembled enclosure, although the dimensions may be varied as desired to accommodate various sized animals. When the enclosure is used as a kitty litter area, it will protect the litter from being spread to surrounding area, particularly as the cat kicks up litter when burying its body waste. The enclosure also protects the surround area by effectively containing odors from the soiled litter.

It is contemplated that the invention be marketed in its completely collapsed state, although for space saving purposes it may be desired that at the front and back walls 35, 30 be folded inwardly on bottom wall 1, the dimensions of the front and back walls permitting a folded overlapping arrangement thereof on bottom wall 1. Similarly, if desired, the roof walls 13, 18 can be folded in overlapping relation on bottom wall 1 for greater space saving. Alternatively, the blank can be left in an unfolded state. It is contemplated that the disassembled or collaped blank can be packaged so that the consumer may purchase a number of the blanks in a group.

Because the invention is adapted to be sold as an easily-assembled blank without any pre-assembly by the manufacturer, it can be sold at a reduced cost. Further, because the blank is adapted to be sold in a disassembled state without kitty litter packaged therein, space, weight and cost savings are further realized.

The symmetric design of the blank according to the invention provides a sturdy and stable construction in the assembled state, and simplifies assembly. When it is desired to dispose of the enclosure and its contents, the user has merely to close and affix the flap 38 in position over passageway 39 to entirely seal the apparatus. No disassembly of the enclosure is required for disposal, and the entire assembled closed unit can merely be carried out for trash collection. The symmetric and solid construction of the assembled enclosure ensures that it will withstand the weight of the soiled litter without breaking apart.

While there have been described above what are at present considered to be the preferred embodiments of the invention, it will be understood that various changes and modifications may be made therein without departing from the spirit of the invention. The scope of the invention is indicated by the appended claims.

We claim:

1. An animal enclosure apparatus, comprising:
   a blank formed of a sheet of substantially stiff foldable material;
   said blank including:
   an oblong bottom wall portion;
   opposite side and roof wall portions extending symmetrically outwardly from, and coextensively with, first and second relatively longer sides of said oblong bottom wall portion; and
   opposite front and back wall portions extending symmetrically outwardly from, and coextensively with, third and fourth relatively shorter sides of said bottom wall portion;
   fold lines being provided along said first, second, third and fourth sides of said bottom wall portion, and between said side and roof wall portions of said combined portions; four triangular gusset portions, each said gusset portion joining a said side wall portion and one of said front and back walls; and
   portions of said blank being folded upwardly at said fold lines in an assembled state of said apparatus such that said front, back and side wall portions are arranged in substantially vertical planes, said bottom wall portion is arranged in a substantially horizontal plane, and said roof wall portions are arranged in inclined planes extending upwardly and inwardly from said side wall portions, such that said apparatus defines a complete enclosure.

2. An apparatus according to claim 1, wherein said front and back wall portions each include bendable triangular flap portions adapted to be positioned adjacent inside surfaces of said roof wall portions in an assembled state of said apparatus.

3. An apparatus according to claim 2, wherein:
   said front wall portion is provided with a passageway dimension to permit a household pet to enter and exit said apparatus; and
   said passageway is defined by a flap defined in said front wall portion, said flap being adapted to be bent outwardly and downwardly to open said passageway, and back upwardly and inwardly to close said passageway.

4. An apparatus according to claim 3, wherein:
   said apparatus is dimensioned to comfortably accommodate a cat therein; and
   said passageway is dimensioned to permit a cat to enter and exit said apparatus.

5. An apparatus according to claim 2, wherein:

each said gusset portion being provided with a fold line permitting said gusset to be folded inwardly to define a closed corner portion in said assembled state of said apparatus.

6. An aparatus according to claim 5, wherein:
said gusset portions are provided with self-stick adhesive means for securing same in a folded position.

7. An apparatus according to claim 1, wherein:
each of said combined side and roof wall portions includes an outer handle portion;
a fold line is provided between each roof wall portion and handle portion; and
said handle portions are folded outwardly in said assembled state of said apparatus, and means are provided for connecting said handle portions together adjacent the upper inner edges of said roof wall portions.

8. An apparatus according to claim 7 wherein:
said means for connecting said handle portions includes an adhesive and a handle flap which folds to fit through an opposed handle portion.

9. An apparatus according to claim 1, wherein:
said opposite front and back wall portions of said blank extend outwardly from said bottom wall portion a distance less than the dimension of said first and second relatively longer sides of said bottom wall portion, to permit said front and back wall portions to be folded inwardly in overlapping relation on said bottom wall portion in a collaped state of said apparatus.

10. An apparatus according to claim 1, wherein:
said blank is formed of a disposable biodegradable material, such as cardboard.

11. An apparatus according to claim 1, wherein:
each of said front, back, side and roof wall portions is substantially rectangular; and
the outer corner portions of each of said front and back wall portions are provided with a fold line defining a bendable triangular flap portion adapted to be positioned adjacent an inside surface of a roof wall portion in an assembled state of said apparatus.

12. A kitty litter apparatus according to claim 1, wherein:
said blank is formed of a disposable biodegradable material, such as cardboard.

13. A disposable kitty litter enclosure apparatus for assembly by a user, comprising:
a blank formed of a sheet of substantially stiff foldable material;
said blank including opposite combined side and roof wall portions extending symmetrically outwardly from, and coextensively with, first and second relatively longer sides of said oblong bottom wall portion; and
opposite front and back wall portions extending symmetrically outwardly from, and coextensively with, third and fourth relatively shorter sides of said bottom wall portion;
four triangular gusset portions joining said side and roof wall portion and said front and back wall portions;
fold lines being provided along said first, second, third and fourth sides of said bottom wall portion, and between said side and roof wall portions of said combined portions;
portions of said blank being adapted to be folded upwardly by a user at said fold lines to assemble said apparatus such that said front, back and side wall portions are arranged in substantially vertical planes, said bottom wall portion is arranged in a substantially vertical planes, said bottom wall portions are arranged in inclined planes extending upwardly and inwardly from said side wall portions, such that said aparatus defines a complete enclosure;
said front wall portion being provided with a passageway dimensioned to permit a household pet to enter and exit; and
said apparatus as assemlbed by said user being adapted to receive and contain therein kitty litter material.

14. An apparatus according to claim 13, wherein
said front and back wall portions each include bendable triangular flap portions adapted to be positioned adjacent inside surfaces of said roof wall portions when said aparatus is assembled by a user.

15. An apparatus according 14, wherein:
said passageway is defined by a flap defined in said front wall portion, said flap being adapted to be bent outwardly and downwardly to open said passageway, and back upwardly and inwardly to close said passageway.

16. An apparatus according to claim 14, wherein:
each said gusset portion being provided with a fold line permitting said gusset to be folded inwardly to define a closed corner portion is said assembled state of said apparatus.

17. An apparatus according to claim 16, wherein:
said gusset portions are provided with self-stick adhesive means to permit a user to secure same in a folded position.

* * * * *